April 22, 1952   R. G. WALLENHORST   2,594,237
CLIP RETAINING MEANS FOR GARAND RIFLES
Filed Jan. 22, 1949   5 Sheets-Sheet 1

INVENTOR
Richard G. Wallenhorst
ATTORNEYS

April 22, 1952   R. G. WALLENHORST   2,594,237
CLIP RETAINING MEANS FOR GARAND RIFLES
Filed Jan. 22, 1949   5 Sheets-Sheet 2

INVENTOR
Richard G. Wallenhorst
ATTORNEYS

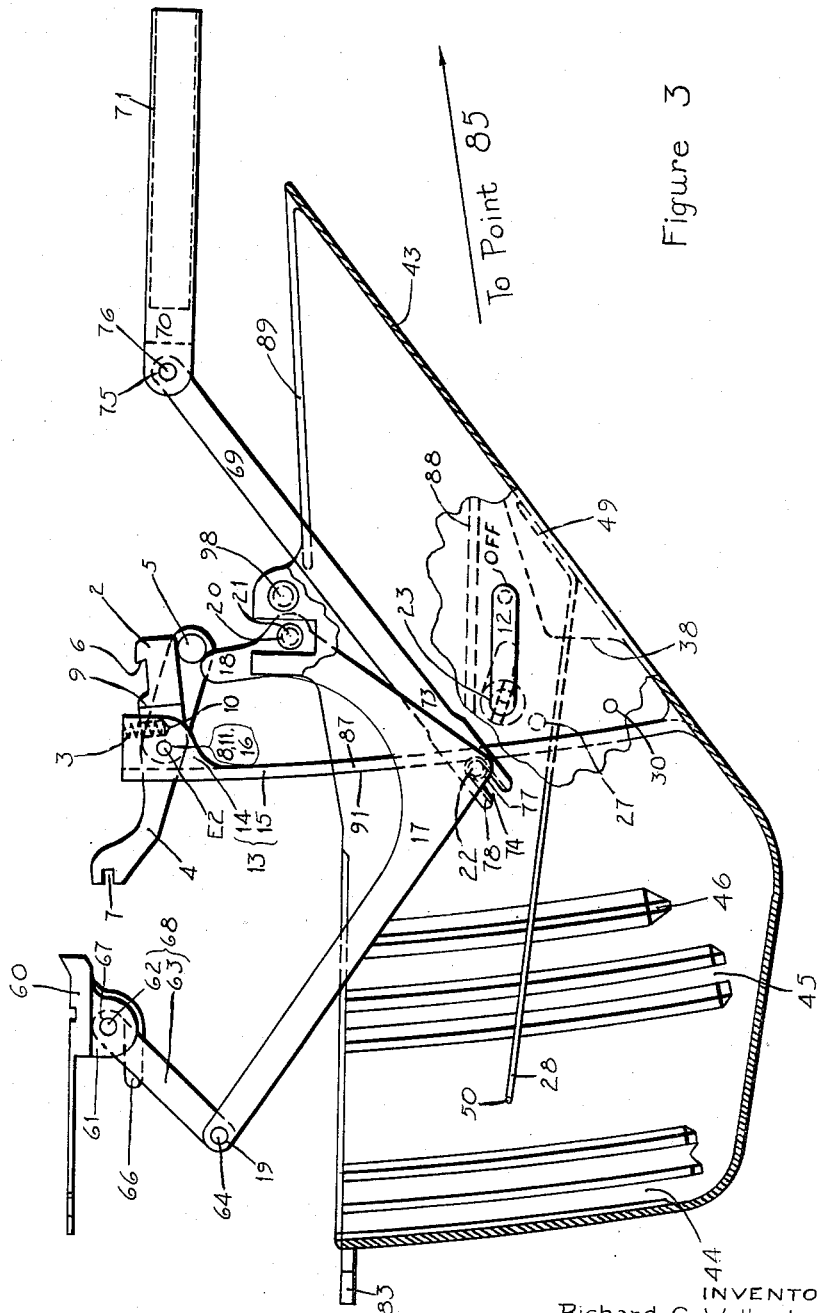

April 22, 1952     R. G. WALLENHORST     2,594,237
CLIP RETAINING MEANS FOR GARAND RIFLES
Filed Jan. 22, 1949                                                              5 Sheets-Sheet 4
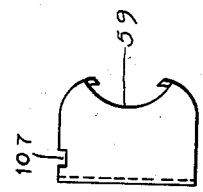
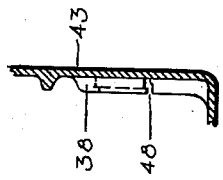
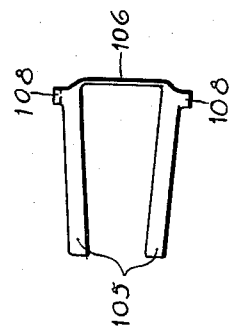
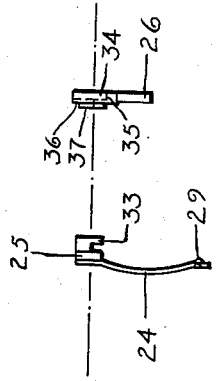
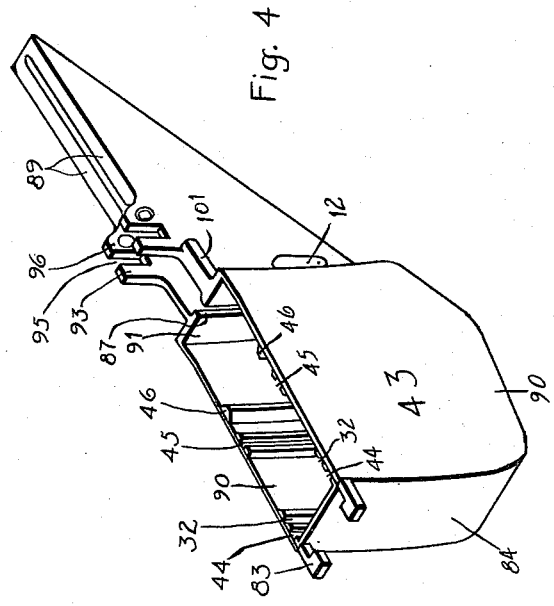
INVENTOR
Richard G. Wallenhorst
ATTORNEYS April 22, 1952 R. G. WALLENHORST 2,594,237
CLIP RETAINING MEANS FOR GARAND RIFLES
Filed Jan. 22, 1949 5 Sheets-Sheet 5

INVENTOR
Richard G. Wallenhorst
BY Morgan, Finnegan & Durham
ATTORNEYS

Patented Apr. 22, 1952

2,594,237

UNITED STATES PATENT OFFICE 2,594,237

CLIP RETAINING MEANS FOR GARAND RIFLES

Richard G. Wallenhorst, Glendale, N. Y.

Application January 22, 1949, Serial No. 72,156

6 Claims. (Cl. 42—18)

The invention relates to improvements in rifles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 3 is a side elevation of the invention with parts of the right hand side of the clip housing still showing, with the parts in their locked position ready to receive a new clip, the clip ejector spring lock in the "off" position, and showing only those parts of the rifle which are parts of this invention. The cartridge retainer and the new clip are also parts of this invention.

Fig. 4 is an isometric drawing of the clip housing;

Fig. 5 is a bottom view of the cartridge retainer;

Fig. 6 is a rear view of the cartridge retainer;

Fig. 7 is a front view of the disassembled clip ejector spring lock;

Fig. 8 is a rear view of the clip ejector spring socket;

Fig. 9 is a view of the top edge of the clip; and

Fig. 10 is a rear view of the clip.

Figure 1:
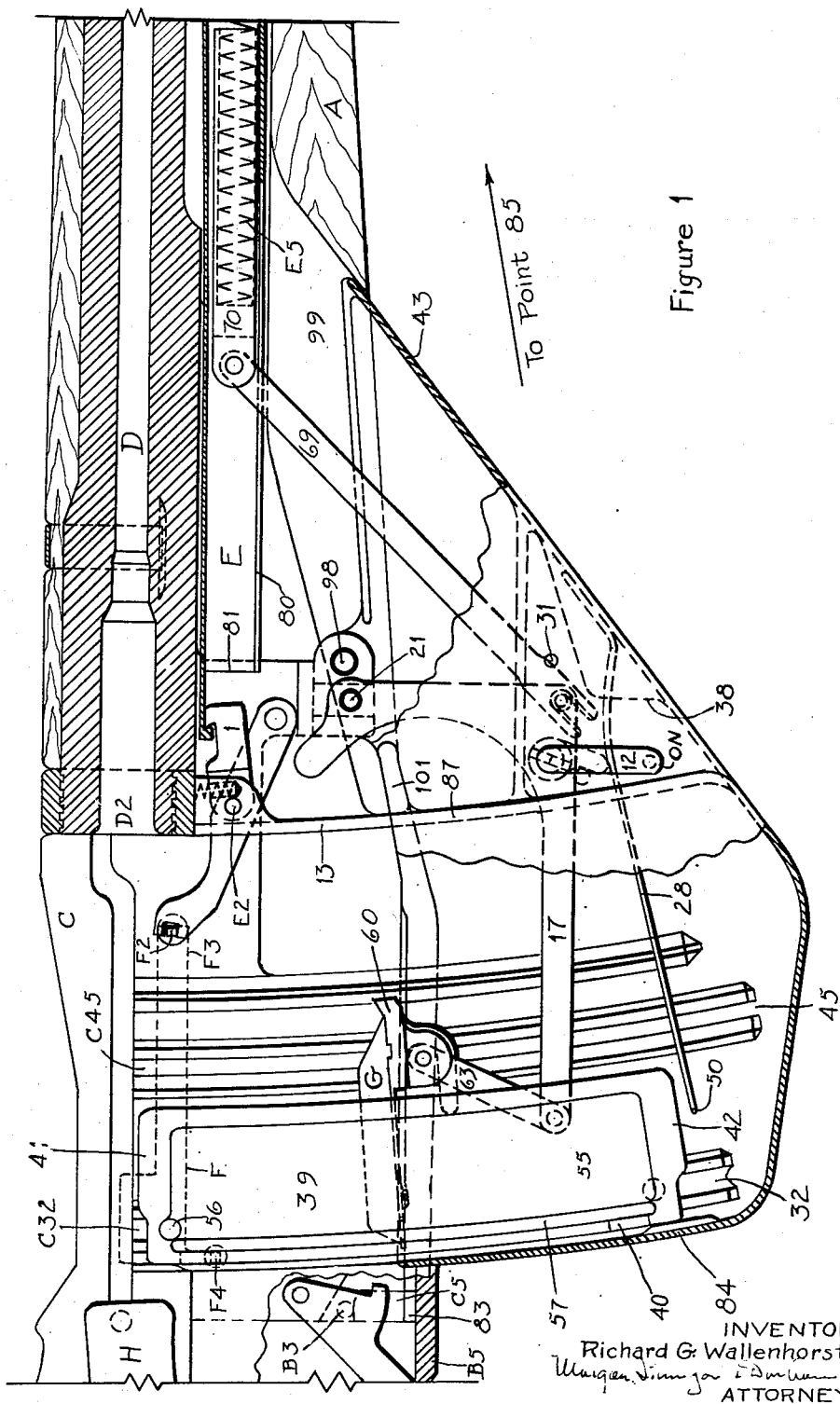
Fig. 1 is a side elevation of the receiver with part of the right hand side of the clip housing still showing, with a retained clip being reloaded while still in the receiver, and the clip ejector spring lock in the "on" position, and showing this invention with relation to the trigger and the barrel and receiver groups of the standard rifle.

The invention is an improvement in the present types of feeding mechanisms now being employed in gas-operated rifles, whether they be either fully or semi-automatic. As described herein, it has been applied to the United States rifle, M-1, caliber .30, known as the Garand rifle, which is a semi-automatic, gas-operated weapon. Said feeding mechanism may be directly applied to the Winchester automatic rifle, which employs an optional selection of either fully or semi-automatic firing, since the optional part of the rifle resides in the trigger mechanism.

The primary objects of the invention are to provide increased round capacity; to provide a clip which can be either expended or retained at the user's option; and to provide an improved operating rod catch assembly safety.

By increasing the depth of the receiver portion of the rifle and by developing a new linkage between the operating rod spring and the follower slide, the capacity of the rifle has been increased from eight rounds to twenty rounds.

With the dual purpose system for the cartridge clip, the soldier may elect to consider the clip as either expendable, or to retain it as an integral part of the rifle. If he elects to consider it as expandable, the clip will be automatically ejected from the receiver when it is empty. If he considers the clip as not expandable he can retain it in the receiver of the rifle, thus permitting him to load from one to twenty rounds into the clip, whether it is empty or still partially filled. With the standard clip-fed rifles, either a full clip must be loaded, or single rounds may be loaded by manually seating the individual rounds in the chamber, as is the case with the Garand rifle. It is believed that this dual purpose system combines the advantages of both a clip and a magazine without the accompanying disadvantages.

When a new clip has been inserted into the receiver of the Garand rifle, the operating rod is automatically released. It snaps forward, carrying the bolt with it, and seating the first round in the chamber. When a new clip is inserted into the modified rifle, the clip is locked in place, but the operating rod remains locked to the rear. In order to release the operating rod and bolt tandem, the operating rod handle must be pulled sufficiently far to the rear to disengage the operating rod from the operating rod catch. The operating rod is then free and the rifle then functions in the same manner as does the standard M-1.

The small spring on the top of the operating rod catch helps to keep the catch depressed until pressure from the follower arm, acting through the cylindrical portion of the clip release arm, forces the catch upwards to engage the operating rod after the clip has been emptied.

As the rounds are fired, pressure from the operating rod spring actuates the feeding mechanism by causing the follower arm to rotate about the central pivot in a clockwise direction.

The follower and slide are continuously in contact with the lowest round in the clip and follow the rounds up inside the clip as they are stripped off from the top of the clip, as with the standard M-1.

When the clip is empty, it is automatically ejected by the clip ejector spring, providing the clip ejector spring lock is in the "off" position. The follower arm has rotated sufficiently far for the finger on it to cam the clip release arm and operating rod catch upward. The rotating of the clip release arm activates the mechanism on the left-hand side of the receiver which releases the clip. If the clip ejector spring lock is in the "on" position, the clip release mechanism will be activated as described above, but the ejector spring will be blocked in its attempt to eject the clip, and the dead weight of the clip will hold it in place until the first round has been loaded into the empty clip and the clip release mechanism once more locks the clip in place.

During the firing of the first couple of rounds from a full clip, the clip ejector spring bears on the lower front corner of the follower, acting as a booster to the force applied by the operating rod spring. The clip ejector spring lock, in either "on" or "off" position, does not interfere with this booster action.

The aforementioned operating rod catch assembly also acts as a safety device by locking the bolt to the rear until such time as the soldier deliberately releases it. The safety device eliminates the danger of the soldier's sustaining an "M-1 thumb," and permits the loading of a full clip into the receiver of the rifle when the soldier is wearing gloves. The loading of the clip is accomplished by pressure applied with the tips of the fingers instead of by the thumb, the advantage residing in the appreciably smaller cross-sectional area of the fingers as compared with the corresponding area of the thumb. It is understood that a lever-type trigger has been developed by the Army, which, together with the safety device, permits both loading and firing of the rifle, even when the soldier is wearing gloves, whereas only firing had been possible before.

This invention may be constructed in various forms without departing from the spirit of the same, and it is understood that the drawings which are attached and made a part of this specification are for the purposes of illustration only and do not define the precise scope or limits of the invention.

All cartridges have been deleted from the drawings in the interests of greater simplicity. In referring to the drawings, all lettered parts are standard parts of the United States rifle, M-1, and are used in connection with this invention by way of illustrating its application to said rifle. All references contained herein to the sides of the rifle are to be taken as follows: The operating rod handle is on the right hand side of the rifle; clockwise rotation as when observing the rifle from said right hand side (all drawings have been made from the right hand side of the rifle); forward is towards the muzzle of the rifle (in these drawings, to the observer's right); lateral motion is in a plane perpendicular to the plane of the paper; and translatory is in the plane of the paper and horizontal.

In order to more clearly demonstrate the differences between the feeding mechanism of the United States rifle, M-1 (Garand) and this invention, and the advantages of this invention over the standard feeding mechanism of said rifle, the following is a brief description of the functioning of the M-1 rifle:

Starting with the parts of the rifle in the position that they assume immediately after the last cartridge has been fired and ejected and the empty clip has been ejected, the bolt and operating rod tandem is locked in its rear position and the receiver is open and clear, ready for the loading of a fresh clip. When a fresh clip is inserted into the top of the receiver, the follower and slide are depressed, causing the follower arm to be rotated counterclockwise. When the follower arm has been fully depressed, a shoulder on it cams the rear end of the accelerator lever upwards. The lever bears against the underside of the locking dovetail of the operating rod, said dovetail being held against the corresponding face of the operating rod catch by the pressure of the operating rod spring acting inside of and against the front end of the hollow operating rod. The accelerator lever, being urged upwards in a clockwise rotation around its pivot pin, cams the dovetail portions of the operating rod and catch apart, thus releasing the operating rod. As the rod moves to its forward position, it carries the bolt forward with it by means of a laterally projecting lug on the right hand side of the bolt which engages in a cam groove on the left hand side of the off-set portion of the operating rod, said portion extending rearwardly along the right hand side of the barrel. As the bolt moves forward, it strips a cartridge from the top of the clip and seats it in the chamber.

When the clip is being inserted into the receiver, the operating rod and the operating rod catch are cammed apart slightly in advance of the point when the clip is fully inserted and locked in the receiver. From the time that the operating rod is unlocked until the time that it moves forward, the presence of the partially inserted clip blocks the forward movement of the bolt, and hence also of the operating rod. Once the clip is fully inserted, the bolt snaps forward, sometimes catching, instead of the first cartridge from the clip, the soldier's thumb as it does so. This latter case would result in the soldier's sustaining what is commonly known as an "M-1 thumb," a rather painful injury that usually means the loss of the thumb nail.

When the first round is seated in the chamber, a pull on the trigger would cause the cartridge to be fired. Under the pressure of the gases entering the gas expansion chamber through the gas port near the muzzle end of the barrel, the operating rod and bolt tandem is moved to the rear, compressing the operating rod spring. As the bolt moves to the rear, the empty shell is extracted and ejected. On the forward movement of the bolt and operating rod tandem, driven by the compressed operating rod spring, the second cartridge is fed into the path of the bolt by the follower and slide. The bolt strips the cartridge from the clip and seats it in the chamber, at which time the firing cycle is ready to be repeated.

After the last round is ejected, the follower rod cams the operating rod catch into operative position, locking the operating rod and bolt tandem to the rear. The clip is automatically ejected from the top of the receiver and the weapon is cleared for a fresh clip. A full clip is inserted and the complete cycle is repeated.

With this brief description of the functioning of the United States rifle, M-1, serving as a preface, the following is a description of this invention as applied to said rifle. With reference to the accompanying drawings, all lettered parts refer to standard parts of said rifle, some parts being slightly modified to accommodate this invention.

In Fig. 3, the parts of the rifle are in the position that they assume immediately after ejection of any empty, expendable clip. The operating rod catch assembly forms the lock that holds the bolt and operating rod tandem in its rear position and which forms a link between the rotating follower arm and the clip latch assembly. The operating rod catch assembly, 1, consists of the operating rod catch 2, the operating rod catch spring 3, the operating rod catch assembly pin E2, and the clip release arm, 4. The bullet guide is also locked in place by the catch pin E2, but does not enter into the functioning of the operating rod catch assembly and so will not be immediately described.

Figure 2:
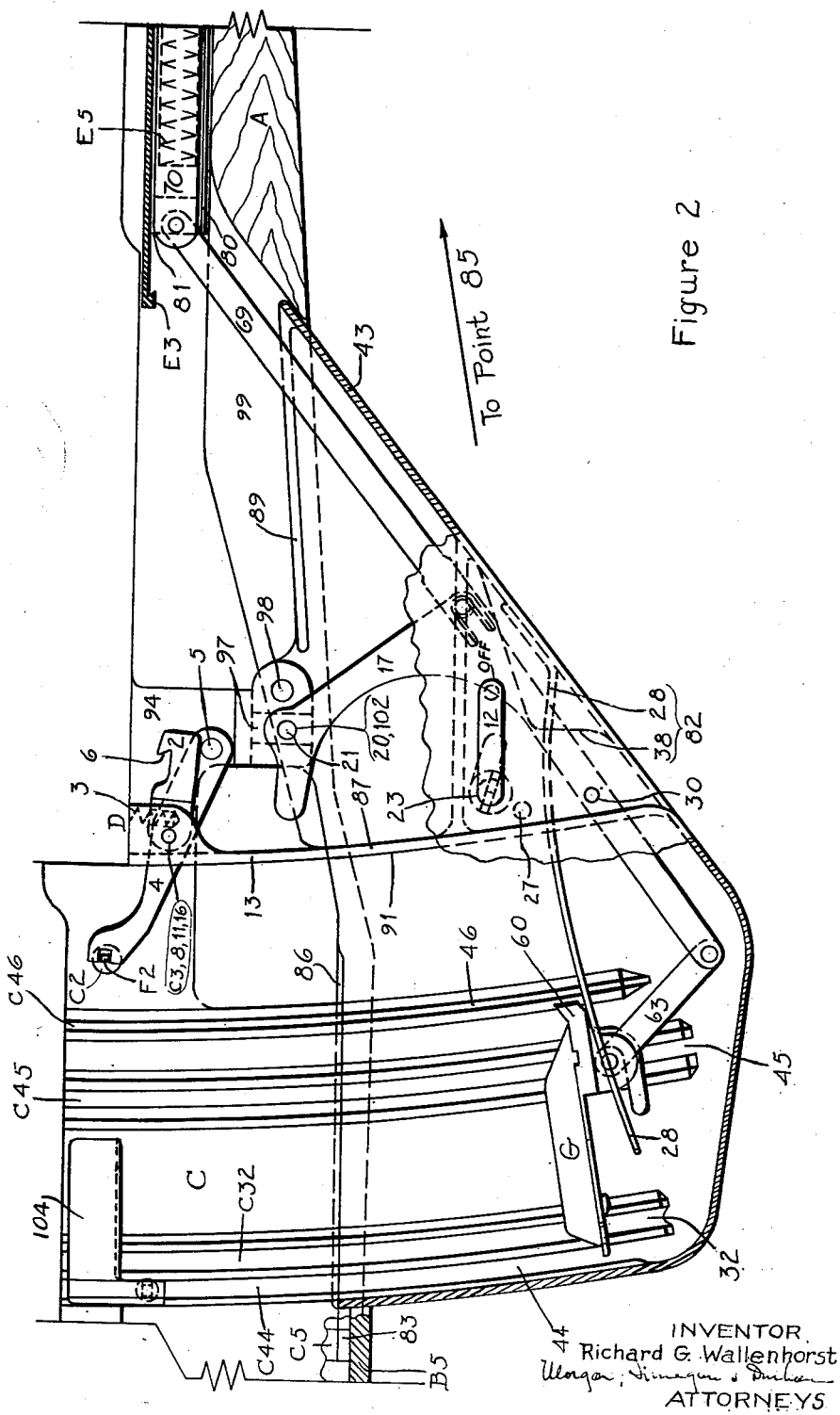
Fig. 2 is a side elevation of the receiver with part of the right hand side of the clip housing still showing, with the cartridge retainer in place, the receiver fully reloaded and ready for firing, and the clip ejector spring lock in the "off" position, and showing this invention with relation to only those parts of the standard rifle which need changes in design.
Figure 11:
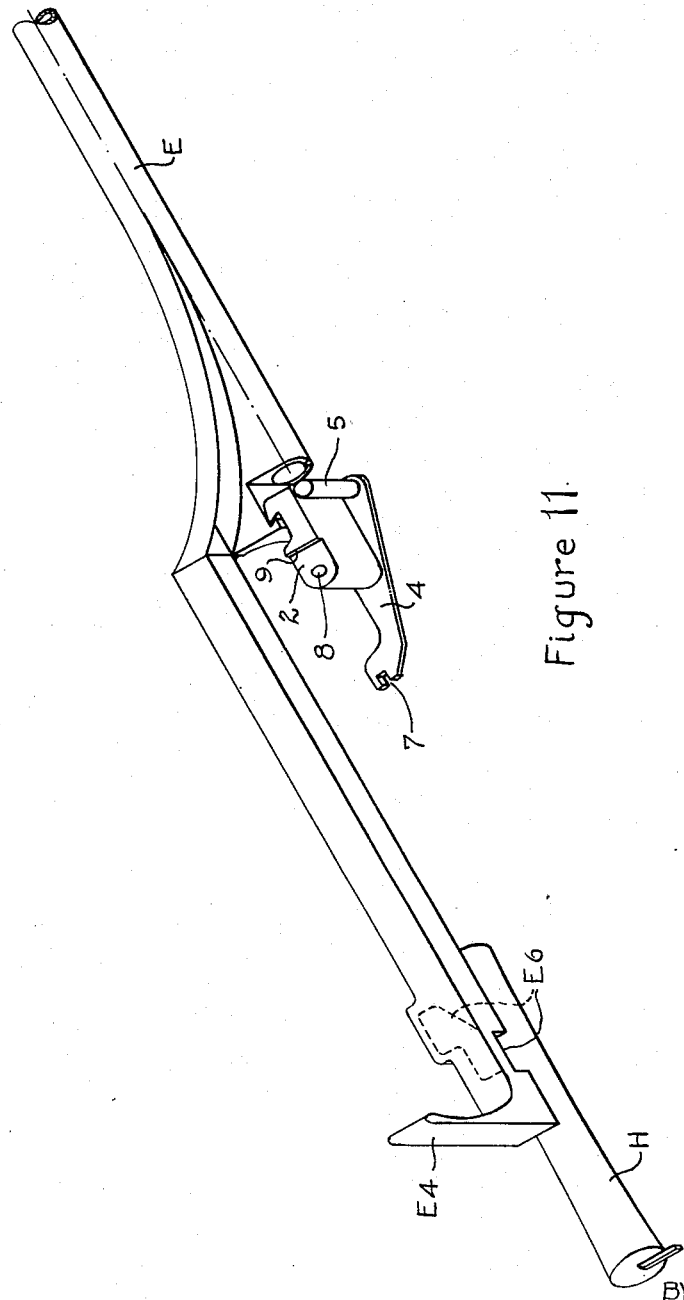
Fig. 11 is a perspective view standing to the rear, below and right of the rifle, illustrating the bolt-operating rod tandem with the operating rod locked by the operating rod catch assembly.

The operating rod E (Figs. 1 and 2) has a dovetail E3 on the rear of the cylindrical portion, immediately to the rear of where the off-set portion of the rod curves to the right of the center line of the cylindrical portion. This off-set portion has a cam groove in its left hand side which engages the laterally projecting lug on the right hand side of the bolt, forming the operating rod and bolt tandem, and also has the operating rod handle extending from the right hand surface. The above mentioned dovetail E3 will ride over the top of the operating rod catch 2, except when the follower arm 17 has been rotated sufficiently far to cause the dovetail groove 6 of the catch 2 to engage the operating rod dovetail E3.

The operating rod catch 2 is generally rectangular in shape, although the rear end may be rounded, as illustrated for a neater appearance. On the right hand side is a clearance cut 9 for the forward foot 14 of the bullet guide 13. Near the rear end is a hole 8 for the catch assembly pin E2. On the top of the catch and immediately to the rear of the front, top edge is the dovetail groove 6 which is so designed to engage the dovetail portion E3 of the operating rod. The inclined surfaces of the dovetail are at such an angle that they will be held locked together by friction until manually released. The portion of the top between the dovetail groove and the front edge is slightly inclined to form a sliding surface for the dovetail of the operating rod to ride over when it is travelling to the rear after the last cartridge has been fired. Also on the top of the catch and immediately to the rear of the dovetail groove 6 is a recess 10 for engaging the bottom end of the operating rod catch assembly spring 3. This spring is so proportioned that it will act inbetween the catch 2 and the bottom of the barrel D, with its bottom end engaged in the recess 10 in the catch, and will prevent the catch from engaging the operating rod except when pressure is applied to the catch by the follower arm.

Operating on the left hand side and on the bottom of the catch 2 is the clip release arm 4. Said arm 4 has a hole 11 near its middle for receiving the catch assembly pin E2 about which the arm rotates. At the forward end of the arm is the clip release arm cylinder 5 either integrally formed or suitably attached thereto. The cylinder 5 transmits the upward pressure of the finger 18 of the follower arm 17 to the bottom surface of the catch 2. The combined height of the catch 2 of the diameter of the cylinder 5 and of the length, curvature, and the angle of the finger 18 are so designed that the catch will not be raised until the bolt H is to the rear after the extraction and ejection of the last cartridge from the receiver, and that when the catch is raised, it will be moved enough to engage the operating rod.

The rear portion of the clip release arm 4 is curved to fit around the rear, bottom edge of the barrel. A slot 7 at the extreme rear of the arm 4 is so located and proportioned to engage the projecting lug F2 which extends through the hole C2 in the left hand side of the receiver C. This lug F2 extends to the right from the clip latch arm F3. By means of the slot 7 and engaging lug F2 connection, any rotation of either the clip release arm 4 or of the clip latch assembly F will cause a corresponding rotation of the engaged part.

The operating rod catch assembly pin E2 is pivoted in the same hole C3 in the forward side walls of the receiver C as on the standard weapon. There is a counterbore on the outer surface of the right hand side wall of the receiver to receive the shoulder on the pin E2. This pin E2 engages the bullet guide 13 through the hole 16, the operating rod catch 2, through the hole 8 and the clip arm 4 through the hole 11.

The clip ejector spring lock 12 rotates in a hole 23 in the side of the clip housing 43. The clip ejector spring socket 38 may be positioned on either side of the clip housing 43 and determine the off-set direction of the center rib 61 of the follower 60, the follower arm link 63, the locking finger 66 on the follower, the forward stud 64 on the follower arm link 63, the stud 22 at the elbow of the follower arm 17, and the off-set end 73 of the operating rod spring guide link 69. The clip ejector spring 28, the clip ejector spring lock 12, and the clip ejector spring socket 38 will hereinafter be considered as being on the right hand side of the clip housing 43 and the other parts off-set accordingly. The clip ejector spring lock 12 consists of a resilient handle 24, clip ejector spring lock pivot 25, clip ejector spring lock bar 26, clip ejector spring lock stop 27, clip ejector spring 28, and clip ejector spring socket 38. The lock handle 24 may be either formed integrally, or suitably attached to the pivot 25, and is used to (a) rotate the lock 12, and (b) to retain the lock 12 in its hole 23. The pressed-in nib 29 on the end of the handle 24 serves to locate the lock in its two positions "on" when the nib fits into the spotdrill 30 and "off" when it fits into the spotdrill 31 on the outside surface of the right hand side wall of the clip housing 43. The lock pivot 25 is of slightly smaller diameter than the hole 23 into which it is inserted on assembly. The cylindrical portion of the pivot serves as a bearing for the lock to pivot on. The finger 33 of the pivot fits into the slot 34 in the lock bar 26. When assembling the lock, the lock pivot and handle, which are permanently attached, are inserted in the hole 23, and pressed in sufficiently far to bring the cut-away portion of the finger 33 clear of the inside surface of the side wall of the clip housing. The lock bar 26 is then slipped onto the pivot finger so that the finger fits into the slot 34 in the lock bar with the end of the finger fitting over the step 35 in the slot 34. The manual pressure on the pivot is released and the lock handle 24 pulls the lock pivot and bar into the hole 23 until the shoulder 36 on the bar comes into contact with the inner surface of the side wall of the clip housing. The shoulder 37 on the bar is of exactly the same diameter as the cylindrical portion, of the lock pivot, and so fits into the hole 23.

In the "off" position, the clip ejector spring lock is completely inoperative. The lock bar is thin enough so that it does not interfere with the movement of the follower arm 17. When the lock handle 24 is rotated clockwise so that the nib 29 fits into the "on" spotdrill 30 in the outer surface of the right hand side of the slip housing, the lock bar 26 has been rotated until it comes into contact with the lock stop 27 which is a lug of suitable shape (cylindrical in the accompanying drawings) protruding from the inner surface of the right hand side of the clip housing a distance equal to the thickness of the lock bar and the clearance shoulder 36 and so located that when it stops the lock bar, the latter will have been rotated slightly beyond the vertical. It will be noted that the finger 33 on the lock pivot has been set at an angle to the longitudinal center line of the lock handle so that the handle will be vertical in the "on" position and horizontal in the "off" position.

In the "on" position, the end of the lock bar will come into contact with the clip ejector spring 28 when less than seventeen cartridges remain in the clip. The clip ejector spring is a piece of suitable resilient material of sufficient length to come into contact with the lower, right hand retaining lip 42 on the clip and to simultaneously fit into the clip ejector spring socket 38. Said socket is located directly below the hole in the forward locking arms of the clip housing, and against the same side inner surface as the lock stop 27. From the drawings, it can be seen that the slot 48 in the socket 38 has a stepped shape for retaining the spring 28 which can be forced in and out of the slot for maintenance purposes, and is held in the slot by its own resilience and curved shape. The spring has a slightly upturned forward end 49 to prevent translatory motion with the stepped slot preventing lateral motion. At the rear end of the spring is a lateral projection 50 which bears against the retaining lip 42 of the clip when the lock is in the "off" position and there are less than seventeen cartridges in the clip. During the firing of the first three cartridges, the spring bears against the bottom front edge of the follower 60 thereby acting as a booster spring to the force applied by the operating rod spring E5 during this period of firing.

For the purposes of this discussion, it has been assumed that the cartridge clip 39 is so proportioned to hold twenty cartridges in a staggered, double row arrangement, although it may vary several cartridges, either more or less, depending on governmental requirements, and still remain within the spirit of this invention.

The cartridge clip 39 consists of a ribbed back 52 and two resilient sides 51. The back 52 is of sufficient strength to withstand the tortional stresses and is ribbed 53 to reduce friction when it is being ejected, and said back being properly curved to conform to the angular displacement of the cartridges. At the rear edges of the sides 51 are two outwardly projecting guide ribs, curved similarly to the back and rectangular in cross-section. Said ribs 54 serve to guide the clip during insertion and ejection and to prevent the clip from walking around inside the receiver, by operating in the corresponding guide grooves C44 and 44 in the side walls of the receiver and the clip housing, respectively. In the ribs 54 are two notches 40, one in each guide rib and so located as to engage the clip latch F4 no matter which end of the clip is inserted first. These notches are of sufficient length so that they permit the hereinafter mentioned closing of the bolt over the top of a full clip.

There are two nibs 56, one on each side of the clip, projecting outwardly, which are so located and proportioned that the lowermost one will contact an obstruction on the wall of the receiver to cause the clip to be deflected to one side as it is ejected from the receiver. Immediately forward of the guide ribs 54 are two inwardly projecting ribs 57, so located and proportioned to engage the extracting necks of the cartridges. These ribs 57 stop a distance from the retaining lips 41 and 42 equal to slightly more than the radius of a cartridge to permit the topmost cartridge to be stripped from the clip by the forward movement of the bolt. A continuation of these ribs 57 are the outwardly projecting friction spaces 55 which extend the same distance vertically, which stop slightly short of the front edge to permit a bearing surface on cartridges two to nineteen of a full clip. The sides 51 have been cut away at the top and bottom rear 58 to permit automatic loading of the clips. The back has been cut away at top and bottom 59 to allow clearance to permit the forwardly moving bolt to strip the topmost cartridge from the clip.

Immediately forward of the cut-away portions, 58, the sides 51 have been curved inwardly to form retaining lips 41 and 42. By means of vertical pressure, these lips serve to retain the cartridges in the clip when the clip is being handled by the soldier. The upper ones also serve to prevent the cartridges from being pushed out of the top of the receiver by the upward pressure of follower and slide, while the lower, right hand one 42 serves as a surface for the clip ejector spring to act on when the clip is to be ejected from the receiver. The lips do not come together, but leave a space between sufficient to clear a single cartridge. The angle that the top and bottom edges of the sides form is such that the lips will lie fast against the end cartridges, and that they will lie along radii of the concentric circles with center at 85. The front edge of the sides form arcs of circles with center at 85.

In holding the cartridges in place in the rifle, the clip 39 forms the back and sides, the bottom surface of the bolt H and the upper retaining lips 41 form the top, the bullet guide 13, and the bullet guide shoulders 91 of the clip housing form the front, and the follower 60 and the follower slide G form the bottom of the cartridge enclosure. The bullet guide 13 consists of a forwardly projecting foot 14 and the main curved guiding portion 15. The foot 14 has a flat top which rests squarely against the bottom of the barrel directly below the chamber D2 to prevent rotational movement, and has a hole 16 into which the pin E2 fits to lock the bullet guide in place. The foot extends forwardly, along the right hand side of the operating rod catch 2 and is sandwiched in between the catch and the forwardly projecting side wall of the receiver. The curved guiding portion 15 extends generally downward from the rear face of the barrel, and the front and rear surfaces are arcs of concentric circles with their center at 85. The rear surface may be further located by stating that it will bear against the noses of the cartridges and prevents misalignment of the cartridges.

The bullet guide, as its name implies serves to guide the cartridges into position to be loaded into the chamber by the bolt. Due to the friction between the first and second cartridges in the clip, resulting from the vertical pressures of the retaining lips and the follower and slide on the stack of cartridges, the second cartridge might be pulled slightly forward by the first cartridge when the bolt is feeding said first cartridge into the chamber. If that should happen, when it comes time for the bolt to feed the second cartridge, which has by then assumed the position formerly occupied by the first cartridge, the bolt would try to push the misaligned cartridge under the barrel instead of feeding it into the chamber. The presence of the bullet guide prevents the misalignment of the second cartridge by providing a surface for the nose of the cartridge to butt against. By placing the center of the concentric circles that determine the arcuate surfaces of the curved portion 15 at the point 85, the rear surface of the curved portion will form a continuation of the bullet guide shoulders 91 on the clip housing. The cartridges are kept in the proper translatory alignment by the bullet guide and the bullet guide shoulders as they are fed upward by the follower and slide.

The follower slide G is the same as in the standard United States rifle M-1 as is indicated by the designating of the part by a letter instead of by a number. Its functioning and purposes are unchanged.

The follower slide G operates on top of the follower 60. The top of the follower 60 is an exact duplicate of the top of the corresponding part in the M-1 rifle, in order for it to operate in cooperation with the standard follower slide. The guide lugs on the sides of the standard follower have been removed and the arcuate guiding of the follower and slide have been delegated to the follower guide pin 62. The slotted portion on the bottom of the standard follower has been replaced by a more positive pin pivot. The follower arm link 63 operates in between the center rib 61 and the locking finger 66, both on the bottom of the follower, with the follower guide pin 62 operating in the hole 67 in the center rib. The sandwiching of the follower arm link 63 in between the center rib 61 and the locking finger 66 prevents lateral movement of the follower 60 since the follower guide pin and the follower arm link are either integrally formed or suitably attached. Lateral movement of the follower guide pin is prevented by its being of the proper length to operate in the guide grooves in the sides of the receiver and clip housing C45 and 45, respectively. The forward end of the follower arm link 63 has a cylindrical projection 64, either integrally formed or suitably attached, which operates in the hole 19 at the rear end of the follower arm 17. The follower arm link fits on the side of the follower arm away from the clip ejector spring for clearance purposes.

The follower arm link 63, with guide pin 62 attached, is assembled onto the follower 60 by placing the bottom edge of the link flat against the bottom of the follower, with the guide pin end foremost. The guide pin is then fitted into the hole in the center rib of the follower and the pin and link unit 68 is moved laterally until the link passes through the cut-away portion forming the finger 66 and comes into contact with the left hand side of the center rib. The pin and link unit is then properly aligned laterally to fit into the opening between the finger and the center rib. By rotating the unit counterclockwise, the unit 68 and the follower 60 will be locked together.

The follower arm 17 is a flat, L-shaped piece of metal which fits into the forward portion of the clip housing to change the translatory pressure of the operating rod spring into the vertical pressure of the follower and slide. At the elbow of the follower arm is either a cylindrical lug, integrally formed, or a stud suitably attached. This stud 22 engages in the C-shaped clot 74 in the off-set end 73 of the operating rod spring guide link 69. The stud 22 has a shoulder 77 on it to prevent lateral movement of the link 69 with respect to the follower arm. Near the end of the short leg of the follower arm is an enlarged portion like a hand, which contains the hole 20 for the central pivot pin 21. This pin 21 has the double duty of being the pivot around which the feeding mechanism rotates and the follower arm specifically, and of locking the feeding mechanism in place with respect to the receiver. Extending upwards and to the rear from the hand of the follower arm is a finger 18. It is the pressure exerted by this finger on the clip release arm cylinder 5 after the ejection of the last cartridge that causes the operating rod catch assembly 1 to be activated.

A clockwise pressure is constantly exerted on the follower arm 17 by the operating rod spring E5 acting through the operating rod spring guide 70 and the guide link 69. The operating rod spring guide link 69 has an off-set rear end 73 which is bent laterally to fit around the follower arm 17 at its elbow so as to engage the shoulder stud 22. At the end of the off-set portion 73 is a C-shaped slot 74 for engaging the shoulder stud 22. A clearance cut 78 has been made on the side of the guide link for the shoulder 77 on the stud 22. Said shoulder 77 prevents relative lateral movement. At the forward end of the guide link is a hole 75 for the pin 76 which locks the guide 70 to the guide link 69. The latter two parts may be made to be disassembled by the soldier for maintenance purposes, or may be suitably permanently pivotally attached, the latter arrangement being preferred. A removable pin attachment means a small part that may be very easily lost in the cleaning process, or lugs which would detract unnecessarily from the strength of the connection. There is considerable strain on this connection due to the sharp change in the line of force acting through the guide and the guide link.

The operating rod spring guide 70 is connected to the guide link 69 by means of the latter fitting into a bifurcated rear end of the guide. The forward end of the guide is a tubular portion, either integrally formed, or a piece of tubing of suitable length permanently attached. The tubular portion 71 of the spring guide acts as a housing for the rear end of the operating rod spring E5 to keep the latter in straight translatory motion. It is of sufficient length to extend inside the operating rod E, even when the follower arm has been rotated to its clockwise limit, thus allowing the maximum expansion of the operating rod spring, yet short enough so that it does not interfere with the slight curve of the operating rod.

The operating rod E is the same as on the standard rifle with one necessary and one preferred modification. The necessary modification is a clearance cut 80 in the bottom of the operating rod for the guide link to operate in when the operating rod is kicked to the rear after each cartridge is fired. The guide link will require the maximum length of clearance when the bolt has just started to come forward over the top of a full clip. The preferred modification is that the curved ending of the tubular portion of the operating rod be cut-off vertically 81 to provide greater bearing surface for the spring guide when the spring is in its most compressed position and there are no rounds left in the clip, and thus to permit reducing the necessary length of the tubular portion of the spring guide.

The operating rod spring E5 is housed in the tubular portions of the operating rod E, and the spring guide 71 with the forward end of the spring pressing against the inside wall of the front end of the operating rod. The rearward pressure of the spring on the spring guide provides the driving force for activating the feeding mechanism, and the forward pressure of the spring on the operating rod provides the pressure for activating the bolt closure.

The last entirely new piece to be discussed is the clip housing 43 which is located directly in front of the trigger guard. The clip housing 43 is composed of two definite sections: A rear section of the proper width to house the lower end of the clip, and a forward section of narrower width to house the follower arm 17, the clip ejector spring assembly 82, and the off-set rear end of the operating rod spring guide link 69.

The rear portion of the clip housing has two rearwardly projecting fingers 83 for locking the clip housing 43 to the trigger group B and the receiver C. The locking shoulders C5 on the sidewalls of the receiver are modified in vertical size sufficiently to permit the sandwiching of the locking fingers 83, between the locking shoulders C5, and the upper surface of the back end of the floor plate B5 of the trigger group. The locking fingers 83 have a plan design which forms an exact duplicate of the bottom surface of the locking shoulders. When the receiver C, the clip housing 43, and the trigger group B are being assembled, a pinchers-like pressure will be exerted by the locking shoulders C5 and the upper surface of the back of the floor plate B5 on the locking fingers 83, thus preventing both rearward and vertical movement of the clip housing.

The back 84 of the clip housing is of arcuate shape with its center of curvature at point 85. Along the inner surfaces of the sides 90 of the rear section of the clip housing is a series of three guiding grooves: the clip shoulder guide grooves 44, the clip nib guide grooves 32, and the follower guide pin grooves 45, and the bullet guide ribs 46. These guide grooves and ribs are of arcuate design, with the center of the arcs at point 85, and are exact continuations of the guide grooves and ribs in the sides of the receive C44, C32, C45 and C46. The top edges of the sides of the rear portion of the clip housing are beveled at 45 degrees as indicated at 86, to permit a comparatively strong lap joint between the clip housing and the side walls of the receiver.

About halfway forward, the width of the clip housing is sharply reduced, thus forming a dividing line between the forward and rear sections. Projecting inwardly from the inside surface of the clip housing side walls 90 are two arcuate guide ribs 87 for guiding the follower arm during its rotational movement. The shoulders 91, formed by the change in the width of the clip housing, together with the rear surface of the guide ribs 87, form a surface which is a continuation of the rear surface of the bullet guide. The guide shoulder of the clip housing and the rear surface of the bullet guide may be formed with a slight forward sweep to eliminate needless friction between them and the noses of properly aligned cartridges.

The bottom of the forward section of the clip housing slopes upward, parallel to the bottom edge of the follower arm 17 when the bolt is closed over a full clip, and extends slightly inside the stock A at the housing's front edge for a relatively dirt-proof connection between the clip housing and the stock.

Immediately forward of the follower arm guide ribs 87 is the clip ejector spring lock stop 27, either integrally formed or suitably attached, and a hole (23), which receive the clip ejector spring lock pivot cylinder which rotates therein. On the outer surface of the same side of the clip housing (right hand side) are the two locating spotdrills for the nib 29 on the handle 24 of the clip ejector spring lock 12. The "on" spotdrill 30 is directly below the hole 23 and the "off" spotdrill 31 is horizontally forward of said hole. Near the top edge of the forward section of the clip housing, extending outwardly from the right hand side wall of the clip housing, and generally above the hole 23, is a projection 101 which serves to fill in the clearance cut 100 in the stock A when assembled to keep out foreign matter.

Extending inwardly and horizontally forward from the right hand follower arm guide rib 87 and above the stop lug 27 and the pivot hole 23 is a supporting rib 88 which extends from said follower arm guide rib to the inclined floor of the clip housing. This rib 88 acts as a support to the follower arm against possible lateral movement which might be caused by the off-set shape of the rear end of the operating rod guide link 69. The supporting rib extends sufficiently far inward to prevent friction between the follower arm and the clip ejector spring assembly 82.

In the corner formed by the right hand side and the inclined floor of the clip housing is located the clip ejector spring socket 38 which may be formed integrally, or, for greater ease in manufacturing, formed separately and then suitably attached. The socket has been previously described in connection with the clip ejector spring assembly 82, and hence, no further discussion should be necessary.

Extending inwardly along the top edges of the sides of the forward section of the clip housing are two guide lips 89 for guiding the operating rod spring guide link 69 through its path of motion. The lips 89 extend from the forward locking arms 96 on the clip housing to the front edge where they merge with the inclined floor of the clip housing. The middle locking arms 93 and the forward locking arms 96 extend vertically from the top edges of the sides of the clip housing. They are slightly forward of the clip housing dividing line. The channel 95, between the middle 93 and the forward 96 locking arms, is filled by the ridges 97 on the forward locking extensions 94 of the receiver. The top surfaces of the arms and the bottom surfaces of the channels butt against the corresponding surfaces of the receiver extensions. In a lateral direction, the follower arm is in the middle. On both sides of the follower arm and bearing against it are the receiver extensions 94. The clip housing locking arms are on the outsides of the extensions.

A shoulder pin 88 fits into a hole in the forward locking arms and in the receiver extensions to form the forward lock. The hole is counterbored on the outside of the right hand arm to receive the shoulder on the pin. The channel-ridges lock helps to prevent lateral and translatory movement, and is further aided by the rear locking fingers 83 on the back of the clip housing. A hole, as shown, is provided for receiving the central pivot pin 21, said pin being used to lock the follower arms 17 into the receiver of the rifle. The forward locking arms prevent movement of the clip housing relative to the receiver in all directions and are further aided by the rear locking fingers 83 on the back of the clip housing.

The forward locking extensions 94 extend downward from the receiver, directly below the chamber D2 of the barrel D to engage the middle 93 and forward locking arms 96 on the clip housing. There is enough room between the extensions 94 at their upper portion to clear the operating rod catch assembly 1, and the dovetail portion of the operating rod. The plan of the lower portions of the extensions is similar to two T's. The heads of the T's are the parts that bear against the hand of the follower arm, and have the hole for the locking shoulder pin 98. The legs of the T's are the ridges 97 which fit into the channels 95 between the middle and forward locking arms of the clip housing, and have the counterbored hole 102 for the central pivot pin 21. This pin 21 is a shoulder pin also. The three counterbored holes are counterbored on the extreme right hand surface of that part. The thickness of the left hand wall of the receiver, forward of the bullet guide rib is narrower than the right hand wall by a distance equal to the thickness of the clip release arm. However, this should not be carried down into the extensions. The follower arm should be located directly below the center line of the barrel of the rifle. The distance between the inner surfaces of the receiver extensions at the top should be equal to the sum of the width of the clip release arm 4, the narrower rear part of the operating rod catch 2 and the foot 14 of the bullet guide, and enough clearance to prevent binding. The operating rod catch assembly pin E2 passes entirely through both extensions. The right hand extension is counterbored to receive the shoulder on the pin.

The clip shoulder guide grooves C44, the clip nib guide grooves C32, the follower guide pin grooves, and the bullet guide ribs C46 of the receiver are slightly arcuate in design on the standard M-1 rifle. The radii of curvature should be changed so that the center of the arcs will be at point 85. The length of the portions of the side walls of the receiver that contain said grooves and ribs should be altered and the bottom edges so beveled that they will engage the top beveled edges of the rear section of the clip housing. The male bevel may be made on either clip housing or receiver, with the corresponding female bevel on the other part, although as herein described the female bevel is on the clip housing and the male bevel is on the receiver.

The trigger group B of the standard M-1 rifle has been so modified that its front surface is now arcuate in design, to conform to the arcuate back 52 of the clip. The clip ejector spring has been removed from the trigger group and placed in the clip housing, as previously described. The floor plate of the trigger group has been cut off to the rear of its front surface a distance equal to the thickness of the back of the clip housing. The floor plate B5 has been further modified so that the distance between it and the locking shoulders, C5, of the receiver is equal to the thickness of the rear locking fingers of the clip housing.

The opening in the underside of the stock A has been so increased in length and the design so modified, that it is of the proper size and shape to fit snugly around the clip housing 43 when assembled. A clearance cut 99 has been added to the front of the opening for the operating rod spring guide link 69 to fit into. A second clearance cut 100, on the right hand side of the opening, is so located to clear the clip ejector spring lock handle 24 on assembly and disassembly, and to receive the corresponding projection 101 on the clip housing when assembled.

The following is a description of the functioning of the modified United States rifle M-1 of the invention, corresponding to the description of the functioning of the standard United States M-1 appearing earlier herein.

Starting with the modified rifle in the position that the parts assume immediately after the last cartridge in the clip has been fired and ejected, and the expendable clip has been ejected, the bolt and operating rod tandem will be locked to the rear by the operating rod catch dovetail 6 engaging the operating rod dovetail E3. The follower 60 and slide G have risen to their highest point under the pressure of the operating rod spring E5 acting through the operating rod spring guide 70, the guide link 69, the follower arm 17, and the follower arm link 63. The clip ejector spring lock 12 is in the "off" position.

As a new, full clip 39 is loaded into the top of the receiver C, the bottom cartridge engages the laterally movable slide G on the follower 60 and cams it either right or left, depending on the displacement of said cartridge. After camming is completed, the follower 60 and slide G are depressed, causing a counter-clockwise rotation of the follower arm 17 and link 63 about the central pivot 21, causing the operating rod spring E5 to be compressed by the operating rod spring guide 70 and link 69 being moved forward. As the follower arm 17 is rotated, the finger 18 on it disengages the cylindrical part 5 of the clip release arm 4, thus freeing the clip release arm 4 so that it can rotate about the operating rod catch assembly pin E2 at the proper time. When the clip has been inserted to the proper depth, the clip latch F4 will engage in the notch 40 in the left hand guide rib 54 of the clip. The notch is of sufficient length so that the bolt may be closed without feeding a cartridge into the chamber by simply manually depressing the clip the necessary additional distance and permitting the bolt to close over the top of the clip. The clip has been so designed that it may be inserted either end downwards. The clip latch F4 will engage the clip, when the latter is fully inserted, under pressure from the clip latch spring. The clip latch arm projection F2, extending through the hole C2 in the left hand side of the receiver, is engaged in the slot 7 in the rear of the clip release arm 4. As the clip latch F4 engages the clip, the clip latch arm F is rotated about its longitudinal pivot, by pressure from the clip latch spring. As the clip latch arm F is rotated, it causes the clip release arm 4 also to be rotated in a clockwise direction, so that the clip release arm cylinder 5 is moved away from the bottom surface of the operating rod catch 2. The latter is held in its upward position by the frictional pressure exerted on the engaging dovetail surfaces of the operating rod E3 and catch 6. The operating rod is continuously under a forward pressure exerted on it by the compressed operating rod spring E5. Said spring also exerts a continuous rearward pressure on the feeding mechanism which causes the latter to be rotated clockwise as the cartridges are stripped from the top of the clip. During the last portion of the downward movement of the clip, the lower, front edge of the follower 60 will bear against the clip ejector spring 28 depressing it. The spring will then be exerting an upward pressure on the follower, as a booster to the operating rod spring pressure. When the clip latch F4 engages the notch 40 in the left hand guide rib 54 of the clip, the clip locking action is completed.

The locking of the clip in the receiver is completely automatic. However, the releasing of the bolt and operating rod tandem is manually accomplished. To close the bolt H, a slight rearward pull must be exerted on the operating rod handle E4 by the soldier. The lug H2 on the right hand side of the bolt H engages in a small recess E6 in the left hand side of the rear portion of the operating rod. The handle itself is a thorn-like projection on the right hand side of the rear portion of the rod. The rear portion of the operating rod extends forward and downward along the right hand side of the rifle until it reaches the dovetail E3 where it bends to the left to the center line of the rifle. The front portion of the operating rod E is tubular and houses the operating rod spring E5, as shown.

The length of the pull for manually disengaging the operating rod E from the catch 2 must be sufficient to permit the disengaging of the dovetail surfaces E3 and 6 and to permit the operating rod catch 2 to move clockwise about its pin E2, under pressure exerted by the catch spring 3 on the top of the catch. The catch will rotate until it comes into contact with the top of the clip release arm cylinder 5. The downward movement of the catch is far enough to clear the dovetail E3 on the operating rod E during the latter's translatory oscillations. By releasing the locking action between the operating rod and the operating rod catch, the bolt and operating rod tandem will be free to move forward which they will do under the forward pressure exerted by the operating rod spring. As the bolt moves forward, it will strip the topmost cartridge from the clip and seat it in the chamber D2, unless the clip has been held depressed until the bolt has started to ride over the top of the topmost cartridge. In this latter case, the bolt must be manually pulled to the rear and then released in order to seat the first cartridge in the chamber. With a cartridge seated in the chamber, the rifle is ready to be fired. The improved feeding mechanism does not interfere, in any way, with the firing of a cartridge, with its automatic extraction and ejection, with the automatic seating of a new cartridge in the chamber, or with the automatic oscillatory movement of the bolt and operating rod tandem during the firing of all except the first and last cartridges in the clip.

The operations leading up to the actual firing of the first cartridge have just been described. When the last cartridge has been seated in the chamber by the bolt, the feeding mechanism will have rotated clockwise until the slide G on the follower 60 is in contact with the bottom surface of the bolt H. At this time, the follower and slide will have been moved up inside the clip 39, with the follower arm 17 and link 63 also partially inside. The parts that participate in the rotary motion are: the follower 60 and slide G, the follower arm 17 and link 63; with the operating rod spring E5, spring guide 70, and spring guide link 69 participating in a generally translatory motion in cooperation with said rotary motion.

The clip ejector spring 28 was in contact with the front, bottom edge of the follower during the firing of the first couple of cartridges, acting as a booster spring to augment pressure of the operating rod spring on the feeding mechanism. After the third cartridge has been seated in the chamber, the lateral projection 50 at the rear end of the ejector spring 28 contacts the lower, right hand retaining lip 42 of the clip, preparatory to ejecting the clip from the receiver at the proper time.

The finger 18 on the follower arm 17, at the time that the last cartridge has been seated in the chamber, will be in contact with the cylinder 5 on the clip release arm 4, but will not be applying any pressure thereon. When the bolt H is automatically moved to its rear position, the follower slide G rises up in front of the bolt face, permitting the final clockwise rotation of the feeding mechanism. This final rotation of the follower arm 17 causes its finger 18 to cam the cylinder 5 of the clip release arm 4 upwards, thus rotating the operating rod catch assembly 1 in a counter-clockwise direction about its pivot pin E2. As the clip release arm 4 is rotated, it causes a related rotation of the clip latch assembly F, resulting in the disengaging of the clip latch F4 from the notch 40 in the side of the clip, and freeing the clip for automatic ejection, said ejection being immediately accomplished by the clip ejector spring 28. Simultaneously with the release of the clip from the clip latch, the counter-clockwise rotation of the operating rod catch 2 has caused its dovetail portion 6 to rise up and engage the dovetail E3 of the operating rod, thus locking the operating rod and bolt tandem to the rear. The rotation also causes a slight compression of the operating rod catch spring. At this point, the rifle is cleared of all cartridges and the empty clip, completing the normal firing cycle.

The clip ejector spring lock may be rotated from the "off" to the "on" position at any time previous to the firing of the last cartridge to obtain a special firing cycle. If the lock is rotated before the firing of the third cartridge, the bar 26 on the inside of the clip housing 43 will be interposed between the stop lug 27 on the inside of the clip housing 43 and the clip ejector spring 28, thus preventing the spring from contacting the lower right hand retaining lip of the clip, and holding the spring in an inoperative position upon completion of the spring's booster action against the follower. If the lock is rotated after the firing of the third cartridge, it will press the clip ejector spring downwards, out of contact with the clip, and will hold it there. The lock bar has been set at a slight angle to the rear of the vertical in the "on" position so that all pressure exerted on it by the spring will cause a firmer retaining of the lock in the "on" position. See Fig. 1 for "on" position and Figs. 2 and 3 for "off" position.

After the last cartridge has been fired, the final clockwise rotary movement will take place, as previously described, with all its resulting actions except for the automatic ejection of the empty clip. The clip latch F4 will disengage the clip 39, but the clip will not be ejected because there will be no upward pressure exerted on the clip, due to the clip ejector spring lock's blocking of the ejection motion of the spring. The clip will be retained by its own dead weight, as an integral part of the weapon instead of being expendable.

If the solider desires to make an empty clip become an integral part of the weapon, he may do so by rotating the clip ejector spring lock 12 to the "on" position, opening the bolt, and sliding the clip downwards into place in the receiver. It should be noted that the lock may be manually rotated to either "on" or "off" position at any time, regardless of whether or not there is a clip, either empty, partially full, or full, in the receiver. Caution should be exercised by the soldier in rotating the lock from "on" to "off" when there is an empty clip in the receiver and the bolt is open, since a sudden rotation might result in enough of a snap action by the ejector spring to cause the clip to be suddenly thrown out of the receiver.

It will now be described how this invention permits loading of less than the full capacity number of cartridges into either an empty or a partially empty clip, or the full number of cartridges into an empty clip. The first case is of an empty, retained clip. With the bolt locked in the open position, the cartridges may be loaded one at a time into the clip until it is filled. The first cartridge loaded will cam the follower slide either right or left, and subsequent cartridges will automatically arrange themselves in a staggered, double row arrangement. As the cartridges are loaded, the follower and slide will be depressed, causing the counter-clockwise rotation previously described in connection with the insertion of a new, full clip into the receiver. It will be remembered that the clip latch action was independent of the operating rod action. The reason for this partially automatic, partially manual replacement of the completely automatic action of the operating rod catch assembly of the standard U. S. M-1 rifle will now be obvious. With the fully automatic bolt closure, only one cartridge could be loaded before the bolt snapped forward. After the desired number of cartridges have been loaded into the retained clip of the modified rifle, the bolt and operating rod tandem are manually released, as has been previously described.

The second case is that of loading one or more cartridges into a partially-filled clip while the clip remains in the rifle. Rotate the clip ejector spring lock to the "on" position. The bolt and operating rod tandem are manually drawn to the rear by a pull on the operating rod handle. This will cause the extraction and ejection of the unspent cartridge in the chamber and the soldier should retract the handle with his right hand while holding his left hand over the receiver of the rifle to intercept the unused cartridge as it is ejected. The rifle may be cradled in his lap in order to free both hands. His left thumb should be placed against the clip latch thumb space on the clip latch arm so that it can be manually rotated at the proper time. When the bolt has been fully retracted, the unused cartridge will be ejected against the palm of the left hand. With the left hand still in place, the clip latch arm is rotated by the left thumb. The rotation will cause the clip release arm to be rotated counterclockwise, in turn causing the operating rod catch to be rotated counter-clockwise so that its dovetail will engage the dovetail on the operating rod, and will lock the operating rod and bolt tandem to the rear. The rotation of the clip latch arm will cause the release of the clip from the clip latch, so that the clip latch arm should be released as soon as the operating rod is locked in place. The clip will have risen slightly under the influence of the upward pressure of the follower and slide on the bottom of the stack of cartridges. Before the left hand is removed, the clip should be pressed back down into its latched position. The ejected, unused cartridge may now be reloaded into the clip along with the desired number of cartridges to be loaded. The bolt is then manually released, as previously described.

The maximum number of cartridges that may be loaded into a rifle at one time is one more than the full capacity of the clip. A full clip is loaded into the receiver and another cartridge is manually loaded into the chamber. The bolt is then permitted to close over the top of the topmost cartridge in the clip and engage the cartridge in the chamber. A pull on the trigger will then fire the cartridge in the chamber starting the firing cycle.

The improved feeding mechanism will be heavier and bulkier than the standard eight round clip feeding mechanism. Most of the additional weight is due to the increased load of cartridges (an increase of 150%), as is most of the additional bulk. Actual firing tests, using a wooden mock-up attached to a standard M-1 rifle, have proven that the additional bulk in no way interferes with the firing of the weapon in any position.

The major advantages of a magazine over a clip have been that the magazine can be made to carry an appreciably larger number of cartridges than the standard clip, and that the magazine can be partially loaded, whereas the standard clip must be fully loaded. The major advantages of the clip over the magazine are that the clip can be manufactured more economically and therefore can be considered expendable; that even after long periods of storing fully-loaded clips, they operate equally well as newly-loaded clips. Along these same principles and on the disadvantage side of the magazine are that long periods of storage of fully-loaded magazines usually results in a weakening of the built-in follower spring (the upward pressure of the follower spring in the magazine corresponds to the rearward pressure of the operating rod spring in clip-loaded rifles), and the comparatively high manufacturing cost of the magazine necessitates the retaining, by the soldier, of the empty magazine for future use. This means that the soldier is inconvenienced by having to carry all his empty magazines with him and that he must be considerably more careful of a magazine than a clip since the magazine easily becomes useless through only slight damages. It is believed that by increasing the capacity of the clip, in conjunction with the clip ejector spring lock and the semi-automatic bolt closure, the modified clip will embody all the advantages of both clip and magazine while eliminating the disadvantages of the two.

The need for a larger clip can be seen from the increased emphasis on fully-automatic shoulder weapons of approximately twenty round capacity which, to date, have had to rely on magazines exclusively. During the war soldiers in the Pacific were having magazines welded into their rifles in order to increase their capacity.

It is believed that the partial loading of a retained clip is of significant value. Heretofore, a clip had to be fully loaded, or not at all. Cartridges from .30 caliber machine gun belts and from .30 caliber magazines are interchangeable with ammunition for the .30 caliber M-1 rifle. During the course of a battle, a soldier will sometimes happen on some unused .30 caliber ammunition. In order to use these in his own standard rifle, he must either have the exact number to fill a clip, or he must manually load them, one at a time, into the chamber. Furthermore, when fighting in jungle areas, a clip that is ejected with the force of the standard M-1 rifle may very easily become lost so that the soldier may not have a clip to reload should he be lucky enough to find some unused .30 caliber ammunition.

With an eight cartridge clip, he has a fair chance of picking up enough ammunition to fill one or more clips. With a twenty cartridge clip, his changes are much poorer. However, with the improved feeding mechanism, which includes the new, semi-automatic operating rod catch assembly, he does not have to pick up any specific number of cartridges. Also he can immediately load them into the retained clip, if it is partially empty, thus eliminating most of the danger of losing any loose cartridges that he may be carrying in his pockets.

Even though the modified rifle is designed specifically to use a twenty-round, curved back clip, the standard eight-round straight-backed clip can be used. The height of the clip is short enough and the radius of curvature to point 85 of the modified rifle is great enough to permit the use of both clips. However, since there are several curved portions of the trigger and receiver groups which locate the clip in the weapon, it is to be expected that the straight-backed eight-round clip will require greater manual pressure to insert it into the receiver. The clip latch extending inwardly through the left hand wall of the receiver, will catch in the cooperating notch in the guide rib of the clip, exactly as it does on the standard M-1 rifle, since the relation between these two standard parts has not been changed in the modifying process. After the clip has been properly seated in the receiver, the modified rifle will operate in the same manner as it does with a twenty-round clip in the receiver and the clip ejector spring lock rotated into the "on" position. The eight-round clip is enough shorter than the twenty-round clip so that its lower, right-hand retaining lip will not contact the clip ejector spring, regardless of whether the spring lock is in the "on" or "off" position. After the last round has been fired from the standard clip, the bolt will be automatically locked in its rear, open position by a train of action similar to the emptying of a twenty-round clip. At this point, the soldier may elect to consider the empty eight-round clip as either expendable, or integral. If he elects the expendable option, he must manually remove the clip by inserting a finger under an upper retaining lip and pulling the clip from the receiver. If he elects the integral option, he may immediately proceed to refill the clip in a manner similar to refilling an integral, twenty-round clip.

An additional preventative from dirt stoppages and an infallible safety device resides in the possibility of the soldier's being able to close the bolt with a full clip in the receiver and still not seat a cartridge in the chamber. The elongation of the clip latch notches in the sides of the clip together with the extra-long guide grooves and ribs in the sides of the clip housing permit the manual depression of the clip sufficiently far to allow the bolt to ride over the top of the topmost cartridge in the clip. With the bolt closed on an empty chamber, there is no possible way for a cartridge to be accidently fired. A single, manual oscillation of the bolt and operating rod tandem, as has been previously described, will seat a cartridge in the chamber and set the rifle for immediate firing. When the bolt is closed, as just described, it acts as a dust cover to prevent dust and dirt from entering the receiver from the top, and thus causing stoppages. These two advantages will be of particular help to the officers and men while on the firing ranges.

The semi-automatic action of the operating rod catch assembly, thus far shown as being necessary for the loading of a retained clip, has other advantages. It eliminates the danger of the soldier's sustaining an "M-1 thumb" during the loading of a fresh clip into the receiver, and it permits the loading of a fresh clip into the receiver while the soldier is wearing gloves.

The possibility of sustaining an "M-1 thumb" was previously discussed, during the discussion on the operation of the standard M-1 rifle. This danger is eliminated in the semi-automatic catch assembly by the locking of the bolt to the rear until it is manually released instead of the automatic releasing action of the standard rifle. The same hand that is used to insert the clip is used to release the bolt, and therefore the thumb must be clear of the bolt before the latter moves forward.

The second advantage of the semi-automatic action of the catch asembly is that it permits the soldier to load a fresh clip into the receiver even while he is wearing gloves. This has been fully discussed at the begining of this discussion and a reference back to that point should suffice.

The advantages of this improved feeding mechanism can be further utilized by the use of a cartridge retainer in place of a cartridge clip when the soldier does not have an empty clip. The retainer may be carried in a pocket in the rear end of the stock, as are the tool and the cleaning tube, when not in use.

The retainer 104 consists of two forwardly projecting arms 105 and a connecting back piece 106. The two forwardly projecting arms 105 of the retainer 104 are exact duplicates of the retaining lips 41 of the clip 39 and of sufficient size to give suitable stiffness to them. The small side portions of the retainer do not have friction spaces 55, off-vertical ejection nibs 56, or cartridge extracting neck ribs 57 as the clip does. The back piece 106 does not have the friction ribs 53 that the clip back does. The sides do not have the same cut-away portions 58 as does the clip. The back piece does have the same cut-away portion 59 for the bolt to operate in as does the clip. On the sides of the retainer, near their back edge, are two outwardly projecting guide ribs 108 for engaging in the clip guide grooves C44. The left hand rib has a clip latch notch 107 for engaging the clip latch finger F4. The arcuate shape of the back and sides of the clip need not be carried over to the retainer because of the short length of the corresponding retainer parts. The guide ribs may be made slightly narrower than the guide grooves so that they will not bind.

The use of the retainer is as follows: suppose that the soldier has some loose ammunition, but, for some reason, does not have an empty clip. Ordinarily, the ammunition would be of no use to him, unless he chose to load it into the chamber, one round at a time. With the retainer, he can load up to the capacity of a clip into the receiver of the rifle.

With the bolt in the open position and locked in place, as it will be immediately after the firing of the last cartridge from an expendable clip, the rifle is ready for the retainer. The retainer is inserted into the receiver of the rifle from the top, the same as a clip would be. The guide ribs of the retainer will engage the guide grooves of the receiver, and the clip latch notch will engage the clip latch, locking the retainer in position in the receiver. With the retainer so locked the cartridges may be inserted directly into the receiver. The cartridges will be retained to the rear, by the rear wall of the clip housing and the front of the trigger group; to the bottom of the follower and slide; to the sides by the sides of the clip housing and the sides of the receiver; to the front, by the bullet guide and the bullet guide shoulders of the clip housing; and to the top, by the retainer. The retainer can be removed by pressing in on the thumb piece of the clip latch arm on the left hand side of the receiver, when the bolt is in locked open position, and lifting the retainer out of the receiver.

The retainer will be made of suitable spring metal, of sufficient thickness and strength to withstand the pressures applied to it. The bottom edge of the back and sides is beveled to provide for greater ease in camming the cartridges into the comparatively narrow space between the sides of the retainer as they are fed upwards from the wider receiver.

Let us suppose that a soldier has been using his clips in their expendable capacity, and that, due to the heat of the battle, has not kept track of how many clips he has used up. Let us further suppose that sometime during the firing of his last clip, he comes across some loose .30 caliber ammunition. Without the retainer, he would load the ammunition directly into the clip in the receiver, and put as many additional cartridges in his pocket as he could carry. This would give him a maximum of twenty-one rounds at rapid fire, before he would have to take time out to reload the clip. With the retainer, he could remove the clip from the rifle during a lull in the battle, reload it and put it in his belt for emergency use. Then he would insert the retainer into the receiver and load the rifle with twenty cartridges. In this way, he would have forty cartridges that he could fire off in rapid fashion, with only a slight pause to load the clip.

The retainer is not intended to detract in any way from the advantages of a retained clip, but rather to decrease the possibility that the soldier will have to resort to having to load individual cartridges into the chamber of the rifle. It is obvious that hand loading of a rifle during battle is to be avoided whenever possible.

The modified rifle is not intended as a completely all-around weapon; that is, good for both garrison and combat utility. At present, every infantry squad of twelve men is equipped with one Browning automatic rifle to increase its fire-power. It is believed that the replacing of M-1 rifles with modified rifles would double the fire-power of the remaining eleven men. It is expected that the modified rifle would be classified as a combat weapon, exclusively, just as the BAR now is. The similarity between the standard rifle and the modified rifle would necessitate only a very small amount of additional training in assembly, disassembly, and maintenance. The standard rifle is expected to be used for garrison duty and during the initial phases of training a recruit because of its lighter weight and slightly less cumbersomeness. The soldier would be introduced to, and instructed about the modified rifle immediately after receiving a thorough, basic knowledge of the standard M-1, and before he is advanced to the BAR. From then on, his assignment of a rifle would depend exclusively on whether or not the additional fire-power of the modified rifle would mean the difference between his life or death.

The invention in its broader aspects is not limited to the specific mechanisms shown and described but departures may be made therefrom, within the scope of the accompanying claims, without departing from the principles of the invention and without sacrificing its chief advantages.

What is claimed is:

1. In a rifle of the U. S. Army M-1 or Garand type, in combination a bolt and operating rod, a clip for holding a number of cartridges, means for holding the bolt and operating rod in retracted position when said clip is inserted in loading position, means for manually releasing said bolt and rod, means for ejecting the clip when empty, and optionally-settable means movable to hold the empty clip in the rifle with said bolt and operating rod holding means holding said bolt in retracted position whereby reloading thereof may be effected while the bolt is in retracted position.

2. In a rifle of the U. S. Army M-1 or Garand type, in combination a clip for holding a number of cartridges substantially greater than eight, a bolt, an operating rod, linkage actuated by said operating rod for feeding cartridges through the clip into the path of the bolt, means for ejecting the clip when empty, and optionally operable means for restraining action of the ejecting means for retaining the emptied clip in the rifle, means for holding the bolt in a retracted position whereby the clip is capable of being reloaded when so retained.

3. In a rifle of the U. S. Army M-1 or Garand type, in combination a clip for holding a number of cartridges substantially greater than eight, means for ejecting the clip when empty, optionally operable means for retaining the emptied clip in the rifle, a bolt, and means for holding the bolt in retracted position when the clip is retained.

4. In a rifle of the U. S. Army M-1 or Garand type, in combination a bolt and operating rod, a cartridge clip, means for retaining the clip in the rifle after it has been emptied, and manually releasable means for holding the bolt in retracted position while said clip is retained, said bolt holding means being optionally effective also when the clip is partially empty.

5. In a rifle of the U. S. Army M-1 or Garand type, in combination a cartridge clip positioned in the rifle receiver, a receiver, power-operated means for feeding cartridges from the clip to the rifle chamber, a clip-ejecting device normally operable to eject the clip from the receiver when it has been emptied, and a manually settable lock to prevent ejection of the empty clip.

6. In a rifle of the U. S. Army M-1 or Garand type, in combination, a bolt, a receiver, a clip for holding about twenty rounds seatable in the receiver, an automatically operated follower for feeding cartridges from the clip into the path of the bolt, a clip-ejecting spring, said spring having cooperative engagement with the follower to act as a booster during a portion of the movement of the follower, and selectively operable means for restraining said spring from ejecting the clip, said means being positioned to permit limited initial movement of said spring whereby it remains free to act as such booster.

RICHARD G. WALLENHORST.

REFERENCES CITED

The following references are of record in the file of this patent:

UNITED STATES PATENTS

| Number | Name | Date |
|---|---|---|
| 919,641 | Rodgers | Apr. 27, 1909 |
| 1,526,847 | Fritz | Feb. 17, 1925 |
| 1,737,974 | Pedersen | Dec. 3, 1929 |
| 1,892,141 | Garand | Dec. 27, 1932 |
| 2,377,338 | Garand | June 5, 1945 |